US012770031B2

(12) United States Patent
Darmour et al.

(10) Patent No.: US 12,770,031 B2
(45) Date of Patent: Oct. 20, 2026

(54) MACHINE LEARNING SYSTEMS FOR MANAGING INVENTORY

(71) Applicant: Oracle International Corporation, Redwood Shores, CA (US)

(72) Inventors: Jennifer Darmour, Seattle, WA (US); Loretta Marie Grande, Seattle, WA (US); Ronald Paul Lapurga Viernes, Seattle, WA (US); Jingyi Han, San Jose, CA (US); Nicole Santina Giovanetti, Rancho Cordova, CA (US); Jason Wong, Seattle, WA (US); Min Hye Kim, Newcastle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 1210 days.

(21) Appl. No.: 17/218,915

(22) Filed: Mar. 31, 2021

(65) Prior Publication Data

US 2021/0334682 A1 Oct. 28, 2021

Related U.S. Application Data

(60) Provisional application No. 63/014,361, filed on Apr. 23, 2020.

(51) Int. Cl.
*G06Q 10/00* (2026.01)
*G06N 5/04* (2023.01)
(Continued)

(52) U.S. Cl.
CPC ............... *G06N 5/04* (2013.01); *G06N 20/00* (2019.01); *G06Q 10/063116* (2013.01);
(Continued)

(58) Field of Classification Search
None
See application file for complete search history.

(56) References Cited

U.S. PATENT DOCUMENTS 9,911,087 B1 * 3/2018 Henderson ........... G06Q 10/047
10,565,543 B1 * 2/2020 Mo ...................... G01C 21/343
(Continued)

OTHER PUBLICATIONS

P Kormushev, S Calinon, DG Caldwell et al. (Reinforcement learning in robotics: Applications and real-world challenges)—Robotics, 2013—mdpi.com (Year: 2013).*

*Primary Examiner* — Hafiz A Kassim
(74) *Attorney, Agent, or Firm* — Invoke

(57) ABSTRACT

Techniques are disclosed for training a machine learning model to select a route for performing tasks in a target set of inventory tasks. The machine learning model may be trained by obtaining training data sets that include characteristics of previously performed tasks by one or more task performers. Example characteristics may include locations associated with the previously performed tasks, a duration of time taken to perform the previous tasks, a route taken to perform the tasks, a sequence in which tasks a set of tasks were performed, and attributes of the task performers themselves. The machine learning model may be trained using these training data sets and the applied to a received set of target tasks. The trained machine learning model may then generate a route and/or sequence in which the tasks of the target set of tasks may be performed.

18 Claims, 6 Drawing Sheets

(51) Int. Cl.

| | |
|---|---|
| ***G06N 20/00*** | (2019.01) |
| ***G06Q 10/0631*** | (2023.01) |
| ***G06Q 10/08*** | (2023.01) |
| *G06F 40/20* | (2020.01) |

(52) U.S. Cl.

CPC ....... *G06Q 10/06316* (2013.01); *G06Q 10/08* (2013.01); *G06F 40/20* (2020.01)

(56) References Cited

U.S. PATENT DOCUMENTS

| | | | | |
|---|---|---|---|---|
| 10,895,463 | B1 * | 1/2021 | Cope | G06Q 10/02 |
| 10,930,157 | B2 * | 2/2021 | Spector | G06Q 10/047 |
| 11,289,200 | B1 * | 3/2022 | Gregg | H04L 63/105 |
| 11,466,997 | B1 * | 10/2022 | Williams | G06Q 10/06316 |
| 11,797,931 | B1 * | 10/2023 | Gross | G01C 21/3461 |
| 11,835,351 | B2 * | 12/2023 | Sujan | G01C 21/3694 |
| 11,853,863 | B2 * | 12/2023 | Bielby | G07C 5/0808 |
| 11,887,003 | B1 * | 1/2024 | Bopardikar | G06N 20/00 |
| 2010/0171368 | A1 * | 7/2010 | Schatz | B60L 53/122 307/104 |
| 2013/0090963 | A1 * | 4/2013 | Sharma | G06Q 10/063112 705/7.13 |
| 2013/0283211 | A1 * | 10/2013 | Malkin | G06Q 10/06 715/844 |
| 2013/0304532 | A1 * | 11/2013 | Cormier | F24F 11/38 705/7.15 |
| 2016/0140507 | A1 * | 5/2016 | Stevens | G06Q 10/1097 705/7.19 |
| 2017/0228846 | A1 * | 8/2017 | Mohr | G01C 21/3407 |
| 2018/0315319 | A1 * | 11/2018 | Spector | G08G 1/0104 |
| 2018/0357511 | A1 * | 12/2018 | Misra | G06F 18/2113 |
| 2019/0011931 | A1 * | 1/2019 | Selvam | G05D 1/0088 |
| 2019/0026663 | A1 * | 1/2019 | Homeyer | G06Q 10/0633 |
| 2019/0102746 | A1 * | 4/2019 | Gupta | G06Q 10/1095 |
| 2019/0130285 | A1 * | 5/2019 | Snyder | G06N 5/022 |
| 2019/0258985 | A1 * | 8/2019 | Guastella | G06F 40/30 |
| 2020/0034757 | A1 * | 1/2020 | Gupta | G06Q 10/047 |
| 2020/0104777 | A1 * | 4/2020 | Bouhini | G06Q 10/063112 |
| 2020/0160709 | A1 * | 5/2020 | Ramot | G06Q 10/047 |
| 2020/0210965 | A1 * | 7/2020 | Garber | G06Q 10/04 |
| 2020/0217672 | A1 * | 7/2020 | Deng | G06Q 10/06316 |
| 2020/0257302 | A1 * | 8/2020 | Soltani Bozchalooi | G05D 1/0088 |
| 2021/0048808 | A1 * | 2/2021 | Bielby | G06N 3/088 |
| 2021/0049445 | A1 * | 2/2021 | Bielby | B60C 23/0488 |
| 2021/0073734 | A1 * | 3/2021 | Aman | G06Q 10/08355 |
| 2021/0150827 | A1 * | 5/2021 | Abramov | G07C 5/0808 |
| 2021/0256434 | A1 * | 8/2021 | Dubey | G06Q 10/06316 |
| 2022/0147897 | A1 * | 5/2022 | Liebman | G06Q 10/06314 |
| 2022/0375271 | A1 * | 11/2022 | Benkreira | G06Q 10/20 |
| 2022/0391487 | A1 * | 12/2022 | Mahmood | H04L 63/0861 |
| 2023/0245651 | A1 * | 8/2023 | Wang | G06N 5/022 704/275 |
| 2023/0419262 | A1 * | 12/2023 | Gross | G06Q 10/10 |
| 2024/0095685 | A1 * | 3/2024 | Gulati | G06T 7/0004 |

* cited by examiner

400

MACHINE LEARNING SYSTEMS FOR MANAGING INVENTORY

BENEFIT CLAIMS; RELATED APPLICATIONS; INCORPORATION BY REFERENCE

This application claims the benefit of U.S. Provisional Patent Application 63/014,361, filed Apr. 23, 2020, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to machine learning systems and applications. In particular, the present disclosure relates to machine learning systems for managing inventory.

BACKGROUND

The number of products carried by retailers, wholesalers, or institutional end-users had increased, and continues to increase, significantly over time. For example, average grocery stores in the 1990s carried fewer than 10,000 distinct products. By the mid 2010s, the number of distinct products in an average grocery store had increased to over 40,000. Similar increases in the diversity of stocked products may be found in a variety of contexts, from building supply retailers to medical service providers to food production. The complexities associated with a more diverse inventory include monitoring inventory levels of the many products, restocking, monitoring inventory for recalled products, among others.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
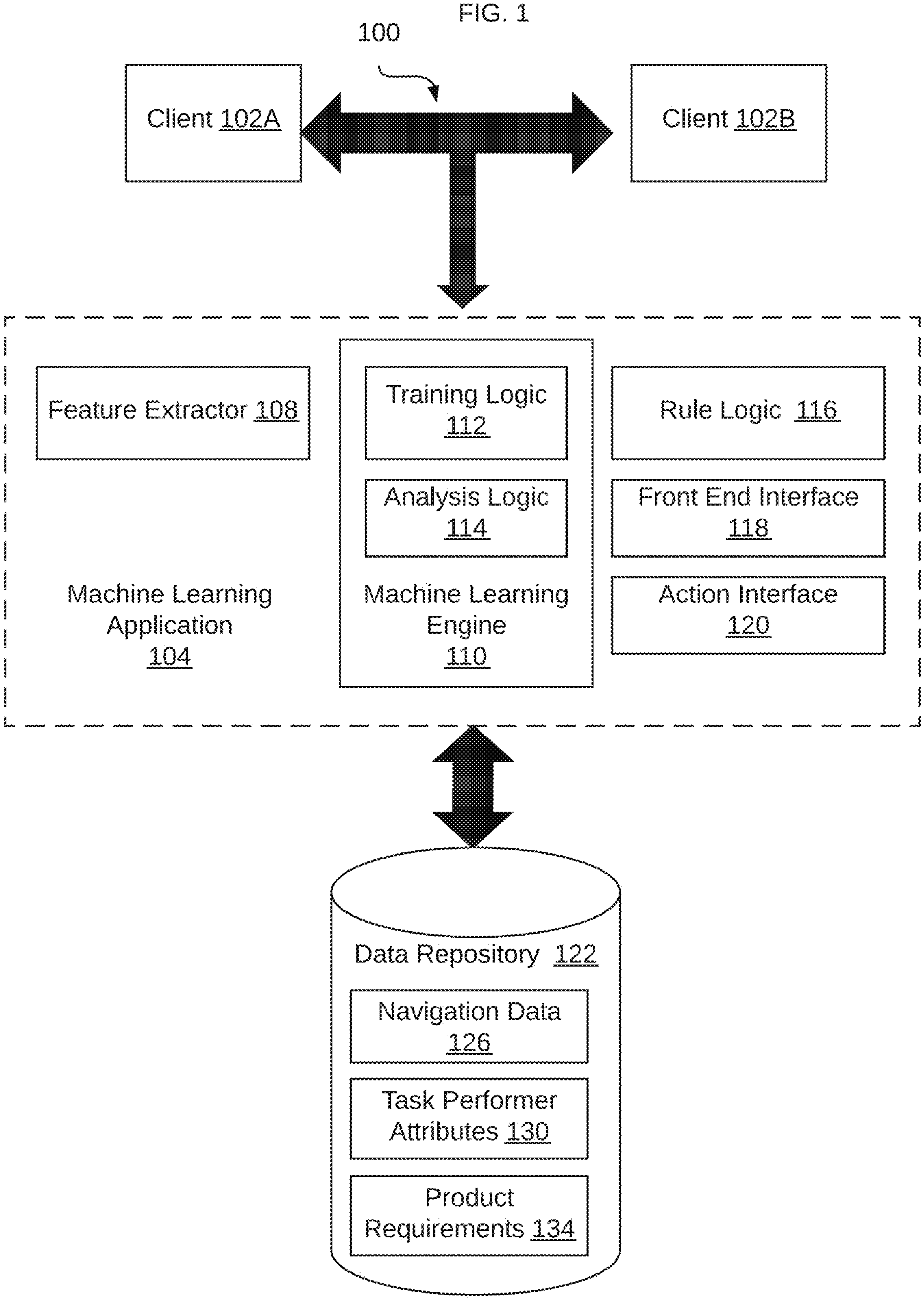
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. GENERATING A ROUTE FOR A SINGLE TASK PERFORMER BASED ON VARIABLE TASK LOCATIONS
4. GENERATING A SET OF ROUTES FOR A CORRESPONDING GROUP OF TASK PERFORMERS BASED ON VARIABLE TASK LOCATIONS
5. EXAMPLE EMBODIMENT
6. COMPUTER NETWORKS AND CLOUD NETWORKS
7. MISCELLANEOUS; EXTENSIONS
8. HARDWARE OVERVIEW

1. General Overview

Managing an inventory with many different products (and even more part numbers) is complicated. The size or complexity of the location at which the inventory resides may further complicate the execution of inventory management tasks. For example, an inventory location that is large (e.g., a warehouse, a farm) or complicated (e.g., a hospital with many small inventory locations distributed throughout an unpredictable floor plan) may increase the time and labor needed to perform inventory management tasks. Examples of inventory management tasks may include, but are not limited to, stocking, re-stocking, monitoring inventory levels, checking for recalled products, and/or removing recalled or spoiled products.

One or more embodiments train and use machine learning models to improve the efficiency and accuracy of performing inventory management tasks. The system trains a machine learning model to select a route for performing tasks in a target set of tasks. The system trains the machine learning model using training data sets that include characteristics of previously performed tasks by one or more task performers. Example characteristics may include locations associated with the previously performed tasks, a duration of time taken to perform the previous tasks, a time of day (and/or week, month, year) at which the tasks were previously performed, routes taken to previously performed tasks, a sequence in which tasks a set of tasks were performed, and attributes of the task performers themselves. The system applies the trained machine learning model to generate a route and/or sequence in which the tasks of the target set of tasks are to be performed.

One or more embodiments described in this Specification and/or recited in the claims may not be included in this General Overview section.

2. Architectural Overview

In some examples, the techniques described herein are applicable to an inventory with many products, inventory stored in a large or complicated structure, or combinations thereof. In some examples, a "task performer" is a human informed of inventory management instructions via a client device. Inventory management instructions may be produced by a trained machine learning model. This information may be delivered to a mobile computing device operated by the human task performer. In other examples, the task performer is a robot that can traverse an environment. In some examples, a task performing robot may complete inventory management tasks in response to instructions wirelessly transmitted to the robot from a transmitter in communication with a trained machine learning model.

FIG. 1 illustrates a system 100 in accordance with one or more embodiments. As illustrated in FIG. 1, system 100 includes a machine learning system for generating a route for performing a set of target inventory tasks. In one or more embodiments, the system 100 may include more or fewer components than the components illustrated in FIG. 1.

The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

As illustrated in FIG. 1, system 100 includes clients 102A, 102B, a machine learning application 104 and a data repository 122.

The clients 102A, 102B may be a web browser, a mobile application, or other software application communicatively coupled to a network (e.g., via a computing device). The clients 102A, 102B may interact with other elements of the system 100 directly or via cloud services using one or more communication protocols, such as HTTP and/or other communication protocols of the Internet Protocol (IP) suite.

In some examples, one or more of the clients 102A, 102B are configured to receive, transmit, process, and/or display tasks (e.g., inventory tasks). The system may also optionally display data related to the tasks, such as navigation data ("routes"), task descriptions (e.g., "restock on shelf A at location 1") and inventory item identifiers (e.g., unique product numbers, SKUs). The system may display these data for training data or "target" data. In some examples, the clients 102A, 102B are in communication with the ML application 104 so that inventory tasks, inventory data, and/or route data may be communicated therebetween. The ML application 104 may analyze data related to tasks and transmit a route to one or more of the clients 102A, 102B.

The clients 102A, 102B may include a user device configured to render a graphic user interface (GUI) generated by the ML application 104. The GUI may present results of the analysis from the ML application 104 regarding inventory tasks and routes. For example, one or both of the client 102A, 102B may submit requests to the ML application 104 via the frontend interface 118 (described below) to perform various functions, such as labeling training data and/or analyzing target data. In some examples, one or both of the clients 102A, 102B may submit requests to the ML application 104 via the frontend interface 118 to view a graphic user interface of pending tasks (i.e., target data of tasks that have yet to be completed), routes and/or sequences generated recommended for the completion of pending tasks (e.g., a triggering event, sets of candidate events, associated analysis windows).

Furthermore, the clients 102A, 102B may be configured to enable a user to provide user feedback via a GUI regarding the accuracy or appropriateness of the ML application 104 analysis. In some examples, a user may revise a route generated by the ML application 104 and submit the revisions to the ML application 104. This feature enables a user to provide new data to the ML application 104, which may use the new data for training.

In some examples, a client device 102A, 102B may include systems for locating the client device 102A, 102B at a location within a facility map. These data may be used to determine a location of the client device 102A, 102B and its associated task performer (e.g., whether human or robotic) relative to a route for performing a target set of tasks. Examples of location-detection systems integrated with or in communication with client devices 102A, 102B may include beaconing technology, global position satellite (GPS) technology to identify locations within electrically rendered facility maps.

In some examples, the machine learning (ML) application 104 is configured to receive training data. Once trained, the ML application 104 may analyze target data that, in some embodiments, includes one or more inventory tasks to be completed. The ML application 104 may analyze the target inventory tasks and generate a route for a task performer to follow for performing the tasks. In some examples, generating the route by implication, also generates a sequence or order in which to perform the tasks. In other examples, the ML application may generate a specific sequence in which to perform the tasks without generating a route. In other examples, the system generates both a sequence of tasks and a route in which to perform the tasks.

As indicated above, the ML application 104 is configured to receive user input, via clients 102A, 102B. In some examples, the received user input identifies a route taken to perform one or more inventory tasks. In some examples, the received user input identifies a completion status of the one more inventory tasks. In some examples, the received user input may modify a route and/or a sequence of tasks that was provided by the system. The ML application 104 may receive user input and use it to re-train an ML engine within the ML application 104. In some embodiments, ML application 104 may be locally accessible to a user, such as a desktop or other standalone application or via clients 102A, 102B as described above.

In one or more embodiments, the machine learning application 104 refers to hardware and/or software configured to perform operations described below with reference to FIGS. 2A, 2B, and 3.

The machine learning application 104 includes a feature extractor 108, a machine learning engine 110, rule logic 116, a frontend interface 118, and an action interface 120.

The feature extractor 108 may be configured to identify attributes and/or characteristics of tasks (e.g., inventory tasks) and/or task performers, and values corresponding to the attributes and/or characteristics of the tasks. Once identified, the feature extractor 108 may generate corresponding feature vectors whether for the tasks, the task performers, or both. The feature extractor 108 may identify attributes within training data and/or "target" data that a trained ML model is directed to analyze. Once identified, the feature extractor 108 may extract attribute values from one or both of training data and target data.

The feature extractor 108 may tokenize attributes (e.g., task/task performer attributes) into tokens. The feature extractor 108 may then generate feature vectors that include a sequence of values, with each value representing a different attribute token. The feature extractor 108 may use a document-to-vector (colloquially described as "doc-to-vec")

model to tokenize attributes and generate feature vectors corresponding to one or both of training data and target data. The example of the doc-to-vec model is provided for illustration purposes only. Other types of models may be used for tokenizing attributes.

The feature extractor 108 may append other features to the generated feature vectors. In one example, a feature vector may be represented as $[f_1, f_2, f_3, f_4]$, where $f_1$, $f_2$, $f_3$ correspond to attribute tokens and where $f_4$ is a non-attribute feature. Example non-attribute features may include, but are not limited to, a label quantifying a weight (or weights) to assign to one or more attributes of a set of attributes described by a feature vector. In some examples, a label may indicate whether an initial route generated for completing one or more tasks is appropriate or not appropriate for one or more of the tasks. For example, a label (applied via user feedback) may indicate that a particular task initially scheduled to be completed in a middle or end of a route (i.e., following some prior tasks) is inapt and instead should be completed near a beginning of a route. In some cases, a label may also provide user feedback regarding a reason for the revision to the route, such as a route closure, priority level, or other reason.

As described above, the system may use labeled data for training, re-training, and applying its analysis to new (target) data.

The feature extractor 108 may optionally be applied to target data to generate feature vectors from target data, which may facilitate analysis of the target data.

The machine learning engine 110 further includes training logic 112, analysis logic and 114.

In some examples, the training logic 112 receives a set of electronic files as input (i.e., a training corpus or training data set). Examples of electronic files include, but are not limited to, electronic files that include task characteristics. Examples of task characteristics include inventory task names/identifiers, task descriptions (i.e., a description of actions to be performed), inventory item names/identifiers/descriptions, routes, time data (e.g., time of day tasks were performed and durations of individual tasks), and the like. A training corpus may also include task performer attributes for task performers that have performed one or more of the tasks identified in the training corpus. Examples of task performer attributes include, but are not limited to, work schedules, certifications, permissions, specializations, weight limits and/or other work condition limitations, task performer type (e.g., robotic or human), navigation/communication system type and/or capabilities, and the like. In some examples, training data used by the training logic 112 to train the machine learning engine 110 includes feature vectors of task and task performer data that are generated by the feature extractor 108, described above.

In some examples, a label in a training data set may indicate whether or not some tasks have been (and should continue to be) performed proximately to one another regardless of location on a route to perform the tasks. For example, a label may indicate that two tasks should be performed in a particular sequence relative to one another even though this sequence may involve a longer or less efficient route. A training data set may also include tokens and/or labels indicating a duration of time between different tasks. The system may use these data to train the machine learning engine 110 to specify time-based aspects of a route and not merely physical aspects of the route.

The training logic 112 may be in communication with a user system, such as clients 102A, 102B. The clients 102A, 102B may include an interface used by a user to apply labels to the electronically stored training data set.

The machine learning (ML) engine 110 is configured to automatically learn, via the training logic 112, preferred routes and/or sequences for performing tasks. In some examples, the ML engine 110 may also automatically learn, via the training logic 112, the relative weights and/or importance of various characteristics and/or attributes of a set of tasks. The system may use these data to generate a route and/or sequence in which tasks are to be performed. Once trained, the trained ML engine 110 may be applied (via analysis logic 114, described below) to target data and analyze one or more attributes of the target data. These attributes may be used according to the techniques described below in the context of FIGS. 2A, 2B, and 3.

Types of ML models that may be associated with one or both of the ML engine 110 and/or the ML application 104 include but are not limited to linear regression, logistic regression, linear discriminant analysis, classification and regression trees, naïve Bayes, k-nearest neighbors, learning vector quantization, support vector machine, bagging and random forest, boosting, backpropagation, neural networks, and/or clustering.

The analysis logic 114 applies the trained machine learning engine 110 to analyze target data, such as task data, to generate a sequence and/or route in which tasks are to be performed. As described herein, task data collectively refers to, for example, task attributes/characteristics, task performance times, task priority and/or urgency levels, route data (e.g., geolocation data, temporary closures), applied data labels, task performer attributes, and the like. The analysis logic 114 analyzes target task data for similarities with the training data.

In one example, the analysis logic 114 may identify equivalent and/or comparable characteristics and/or attributes between one or more tasks and the training data. In some examples, the analysis logic 114 may include facilities for natural language processing so that comparable attributes in task data and training data may be identified regardless of differences in wording. Examples of natural language processing algorithms that the analysis logic 114 may employ include, but are not limited to, document term frequency (TF), term frequency—inverse document frequency (TF-IDF) vectors, transformed versions thereof (e.g., singular value decomposition), among others. In another example, feature vectors may also include topic model based feature vectors for latent topic modeling. Examples of topic modeling algorithms include, but are not limited to, latent Dirichlet allocation (LDA) or correlated topic modeling (CTM). It will be appreciated that other types of vectors may be used in probabilistic analyses of latent topics.

In some examples, once the analysis logic 114 identifies attributes (or a subset of attributes) in target data and corresponding attributes (or a subset) and attribute weights in training data, the analysis logic 114 determines a similarity between the target event data attributes and training data. For example, the analysis logic 114 may execute a similarity analysis (e.g., cosine similarity) that generates a score quantifying a degree of similarity between target data and training data. One or more of the attributes that form the basis of the comparison between the training data and the target data may be weighted according to the relative importance of the attribute as determined by the training logic 112. In another example, such as for a neural network-based machine learning engine 110, associations between events are not based on a similarity score but rather on a gradient descent analysis sometimes associated with the operation of neural networks.

The rule logic 116 may store rules that may optionally be used in cooperation with the machine learning engine 110 to analyze a set of target tasks. In some embodiments, the rule logic 116 may identify criteria that is useful for generating a route and/or sequence for completing a target set of tasks, but that may not be reflected in the training data used to train the machine learning engine 110

In some embodiments, some inventory tasks may require certain preconditions to be performed. In some embodiments, some inventory tasks require a task performer to have appropriate certifications and/or permissions (e.g., for controlled substances, such as medications, electrician's license, specialty equipment license) or some inventory items may have specific handling requirements (e.g., may not exceed certain environmental conditions). In other embodiments, rules may apply transient conditions that may not be promptly or accurately reflected in the training data used to train the ML application 104. For example, temporary route and/or inventory closures due to construction or maintenance may be applied as rules in the ML application 104 analysis. This type of data may be applied via the rules because these changes may not be incorporated into the ML application 104 training data set quickly enough to avoid inefficient inventory task instructions. In some embodiments, rules may apply conditions associated with scheduled events. Scheduled event data (e.g., location and time information) may be incorporated and subsequently removed on a timely and nearly instantaneous basis. Other similar examples are possible.

In one illustration of the usefulness of the rule logic 116, a sudden and temporary route closure may be applied via the rule logic 116. The rule logic 116 is a useful complement to the ML engine 110 because this sudden variation in the normal route is not necessarily reflected in the training data and therefore is not appreciated by the machine learning engine 110. In another illustration, the rule logic 116 may increase urgency of some tasks that are not normally urgent or prioritized (e.g., the urgency/priority of the task in the training data is lower than a current state). For example, an unexpected replenishment of an inventory item that is normally abundant may be applied by the rule logic 116 to supplement the operation of the machine learning engine 110. Changes in task performer operational capabilities, schedules, certifications, and the like may also be applied by the rule logic 116.

In some examples, the rule logic 116 may temporarily apply conditions that supplement the machine learning engine 110 until the training data has incorporated a change in the target data. For example, a physical reconfiguration of a route (e.g., due to construction, remodeling, or other physical environment change) may occur suddenly. Route data from task performers may not be incorporated into the training of the machine learning model 110 until a sufficient number of training data objects are analyzed. Rather than waiting for the ML model 110 training to correctly identify the new traffic patter, the rule logic 116 may apply this condition temporarily. Once the machine learning model 110 incorporates the new data into its analysis, the rule logic 116 may remove stop applying the rule.

In some examples, the rule logic 116 may also analyze preliminary output of the machine learning engine 110 to determine if rules stored by the rule logic 116 need to be applied. For example, upon identifying that the training of the machine learning model 110 reflects requirements applied by one or more rules in the rule logic 116, the rule logic 116 may deactivate application of the one or more rules.

The frontend interface 118 manages interactions between the clients 102A, 102B and the ML application 104. In one or more embodiments, frontend interface 118 refers to hardware and/or software configured to facilitate communications between a user and the clients 102A,102B and/or the machine learning application 104. In some embodiments, frontend interface 118 is a presentation tier in a multitier application. Frontend interface 118 may process requests received from clients and translate results from other application tiers into a format that may be understood or processed by the clients.

Frontend interface 118 refers to hardware and/or software that may be configured to render user interface elements and receive input via user interface elements. For example, frontend interface 118 may generate webpages and/or other graphical user interface (GUI) objects. Client applications, such as web browsers, may access and render interactive displays in accordance with protocols of the internet protocol (IP) suite. Additionally or alternatively, frontend interface 118 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In an embodiment, different components of the frontend interface 118 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the frontend interface 118 is specified in one or more other languages, such as Java, C, or C++.

The action interface 120 may include an API, CLI, or other interfaces for invoking functions to execute actions. One or more of these functions may be provided through cloud services or other applications, which may be external to the machine learning application 104. For example, one or more components of machine learning application 104 may invoke an API to access information stored in data repository 122 for use as a training corpus for the machine learning engine 104. It will be appreciated that the actions that are performed may vary from implementation to implementation.

Action interface 120 may process and translate inbound requests to allow for further processing by other components of the machine learning application 104. The action interface 120 may store, negotiate, and/or otherwise manage authentication information for accessing external resources. Example authentication information may include, but is not limited to, digital certificates, cryptographic keys, usernames, and passwords. Action interface 120 may include authentication information in the requests to invoke functions provided through external resources.

In some embodiments, the machine learning application 104 may access external resources, such as cloud services. Example cloud services may include, but are not limited to, social media platforms, email services, short messaging services, enterprise management systems, and other cloud applications. Action interface 120 may serve as an API endpoint for invoking a cloud service. For example, action interface 120 may generate outbound requests that conform to protocols ingestible by external resources.

Additional embodiments and/or examples relating to computer networks are described below in Section 6, titled "Computer Networks and Cloud Networks."

In one or more embodiments, a data repository 122 is any type of storage unit and/or device (e.g., a file system, database, collection of tables, or any other storage mechanism) for storing data. Further, a data repository 122 may include multiple different storage units and/or devices. The multiple different storage units and/or devices may or may not be of the same type or located at the same physical site. Further, a data repository 122 may be implemented or may execute on the same computing system as the ML application 104. Alternatively or additionally, a data repository 122 may be implemented or executed on a computing system separate from the ML application 104. A data repository 122 may be communicatively coupled to the ML application 104 via a direct connection or via a network.

As illustrated in FIG. 1, the embodiment of the data repository 122 includes storage units that illustrates some of the different types of data used by the machine learning application 104 in its analysis. In this example, the data repository 122 includes storage units storing navigation data 126, task performer attributes 130, and product requirements 134. These storage units illustrate storage of some types of data that the system may use in its analysis and that may be more "stable." That is, these types of data may be updated and/or changed infrequently, thereby lending themselves to storage in a data storage unit that may be conveniently called and/or referenced by the machine learning application 104.

While the machine learning engine 110 may incorporate these data into its analysis, and therefore may not need to access the data repository 122 in every analysis, storing data in the data repository 122 enables system administrators to conveniently update and/or control data as needed. Furthermore, the machine learning engine 110 may use the data repository 122 to update some of its training data. For example, the machine learning engine 110 may in some cases, confirm that its training is accurate by referring to attribute and/or characteristic values stored in the data repository 122 before executing an analysis. The machine learning engine 110 may update any data by treating attributes/characteristic values stored in the data repository 122 as default values.

For examples, the navigation data storage unit 126 may store facility maps, geolocation coordinates and/or way markers of landmarks, inventory locations, and/or task locations, portal coordinates and dimensions (e.g., elevator locations and weight limits, doorway locations and dimensions) and the like, that the system may use to generate a route and/or sequence for performing a set of tasks.

The task performer attribute data storage unit 130 stores data for task performers that may impact the performance of various tasks. These attributes may include work schedules, certifications, performance ratings, per unit time productivity (e.g., efficiency), or operational limitations associated with at least some of the task performers. In one example, a work schedule for a human task performer may comprise a weekly work schedule such as times of shifts during a day and scheduled workdays during a work month. In another example, a work schedule for a robotic task performer may comprise a number of operational hours before a battery recharge is scheduled and a number of operational days before scheduled maintenance requires the robotic task performer to be temporarily out of service.

In other examples, attributes stored in the task performer attribute data storage unit 130 may store task performer certification and/or permissions to perform certain tasks. In one example, a human task performer in a hospital setting may be certified to handle controlled substances such as pharmaceuticals. This certification may be required for completing certain tasks and therefore an indication of which task performers are certified is required for the proper analysis of a target set of tasks. In other examples, some tasks may require repetitive motion and/or lifting of heavy objects. These tasks may require certain safety training for human task performers or may require robotic task performers having a payload rating and optionally a range of motion operational capability that are stored in the task perform attribute data storage unit 130. As described above, these criteria may be stored for convenient reference by the machine learning application 104. Task performer attributes may be stored in profiles for each task performer that are labeled with a task performer unique identifier.

In some examples, product requirements storage unit 134 store attributes and/or characteristics associated with products and that may influence and/or be used by the trained machine learning model 110 to generate a route/sequence for completing a target set of tasks. For example, some products may require certain environmental conditions during transport and storage (e.g., a minimum/maximum temperature, a minimum/maximum humidity, stacking or weight bearing limits). In some examples, the product requirements storage unit 134 identify permissions and/or requirements needed to handle products. That is, the product requirements storage unit 134 identify requirements for the products for which only certain task performers are certified to perform (and which are identified in the task performer attribute store 134). When analyzing a target set of tasks to be performed, the system may identify products associated with a task and reference the product requirements storage unit 134 to determine requirements that must be met when generating a route. Individual product requirements 134 may be associated with a particular product via a profile that is associated with one or more identifying attributes of a product, such as a product name or a product identifier (e.g., part number, serial number, SKU, or unique identifier).

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Generating a Route for a Single Task Performer Based on Variable Task Locations As described herein, managing a diverse inventory may be complicated by the presence of multiple inventory locations or a single inventory location that is large (e.g., warehouse sized), or both. Product requirements, task performer capabilities, navigational complications (e.g., irregular floorplan, unexpected inventory locations), and scheduling requirements all complicate the ability to prescribe an efficient route and/or sequence for performing a set of inventory tasks. In these examples, the time needed to travel between inventory management tasks be significant. Furthermore, in these examples, the risk of traveling to a location and then being unable to perform the task properly (e.g., because a lack of a task performer certification, not meeting a required delivery time, encountering a temporary inventory location closure) may compound the inefficiency. These inefficiencies can decrease the effectiveness and timeliness of managing the inventory.

Figure 2A:
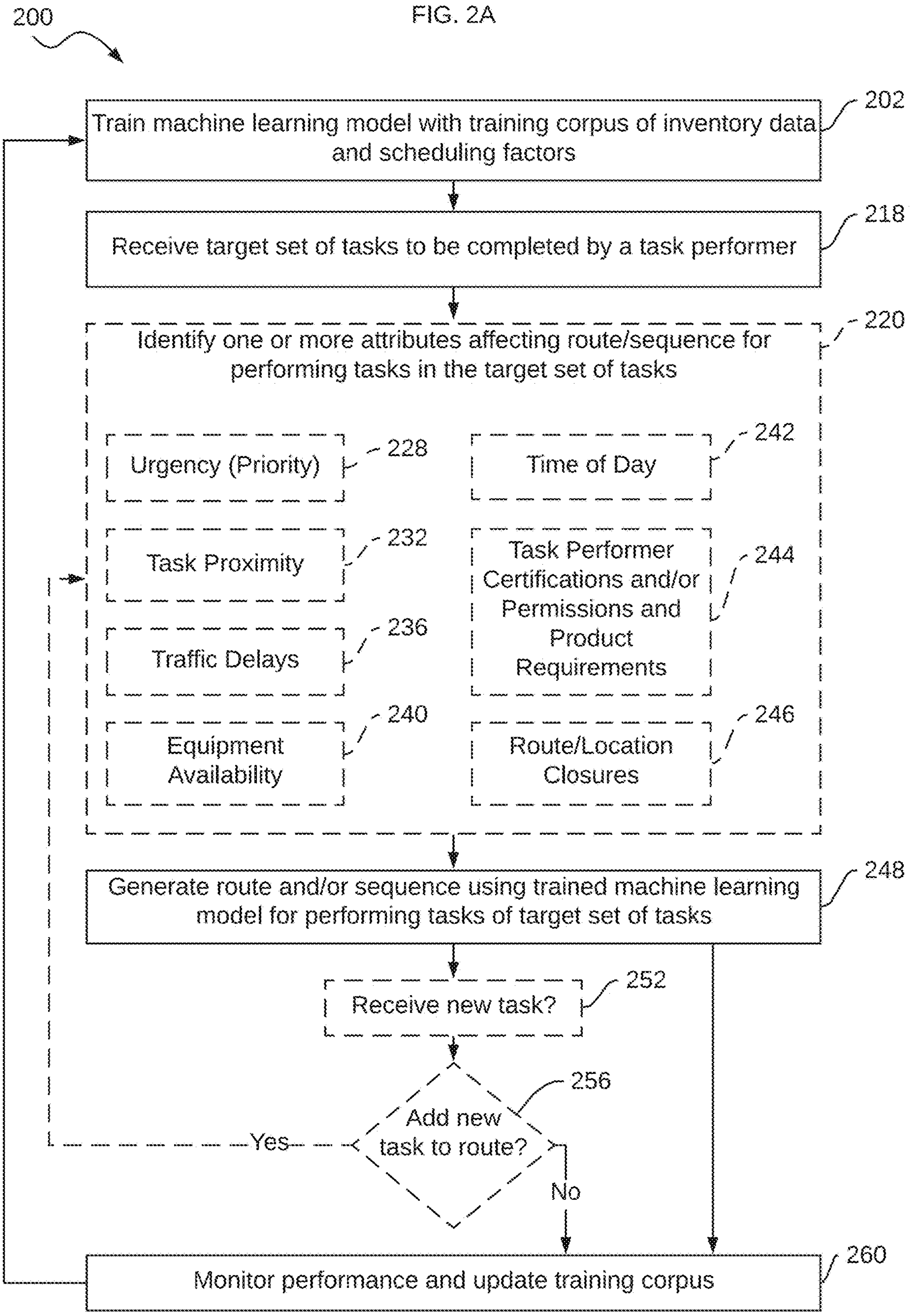
FIG. 2A illustrates an example set of operations for optimizing a route for completing a set of tasks by a single task performer in accordance with one or more embodiments.

FIG. 2A illustrates an example set of operations, collectively referred to as method 200, for generating and providing an order in which a sequence of tasks is to be performed by a task performer. The method 200 also includes example operations identifying a route and/or a sequence for performing a target set of tasks, in accordance with one or more embodiments. In some examples, the method 200 may also provide a description of tasks to be completed at corresponding inventory locations (e.g., restock item number "ABC" at location "123"). One or more operations illustrated in FIG. 2A (and related FIG. 2B) may be modified, rearranged, or omitted all together. Accordingly, the particular sequence of operations illustrated in FIG. 2A (and related FIG. 2B) should not be construed as limiting the scope of one or more embodiments.

In light of this, FIG. 2A illustrates the example method 200 in an embodiment of the present disclosure. The method 200 may begin by training a machine learning model with training data sets (also referred to as a training "corpus") (operation 202). Turning briefly to FIG. 2B, example subprocesses of the operation 202 are illustrated.

The training operation 202 may begin by first obtaining training data sets with which to train a machine learning model (operation 204). At a high level, training data sets associated with the completion of previous inventor tasks may include various different types of characteristics. In some examples, the characteristics associated with the previously completed tasks may be related to the location(s) at which the tasks were performed. In some examples, the characteristics associated with previously completed tasks include geolocation and/or navigational data describing the route and/or sequence in which the tasks were performed. In some examples, the characteristics also include temporal data regarding when the tasks were performed. In some examples, the characteristics associated with previously completed tasks may be associated with one or more attributes of the task performers themselves. In some examples, the characteristics associated with previously completed tasks may be associated with one or more attributes of products involved with the set of previous tasks.

More specifically, a training data set may include route and location data (operation 206). As described above, route and location data may include data related to a floor plan of a facility housing locations at which inventory tasks are performed (operation 206). Examples of floor plan data include, but are not limited to: coordinates of inventory ("storage") locations; portal (hallway, doorway, stairway, elevator) locations; portal dimensions and limits (dimensions, weight limits, portal type) that may restrict equipment passage through a portal and therefore affect a route determination; relative distances between portals; relative distances between inventory locations; inventory location configuration (e.g., shelf configuration, storage conditions); and combinations thereof. In some examples, the data 206 are associated with average (or median) transit times for executing various types of inventor tasks (e.g., as correlated with task performer data 210 and/or task data 212, described below).

In some examples, the system may be trained using data that include identified exceptions to a regular floor plan and/or impacts to expected traffic patterns. These may be stored as "exception data" that are deviations to the route and location data 206 (operation 208). These "exception data" may include construction or maintenance operations that restrict access to a portion of a floor plan whether a doorway, a hallway, a road, or a room. In another example, "exception data" may include physical constraints imposed by particular portions of a route. Examples of constraints include an elevator that is inoperable or has a lower than expected weight limit, a doorway or passageway that is below or above a standard size, and the like. Other exception data may include business operations that similarly restrict access to an inventory location or a pathway to an inventory location. In one example, an operating theater may include an inventory location that may not be accessed by a task performer during medical use of the operating theater. Exception data may include one or more schedules that restrict or temporarily limit access to an inventory location. In still another example, some locations may exhibit a reduced traffic flow at certain times of day. For example, certain junctions, hallways, or locations may be difficult to navigate from traffic volume during shift changes, visiting hours, and the like. These too may be included in exception data 208.

Other examples of data included in a training data set includes task performer attribute data (operation 210). Examples of task performer attribute data include unique task performer identifiers, shift schedules, shift staffing levels, and work locations. In some examples, task performer attribute data includes permission and certifications that are needed to complete tasks or use certain equipment. For example, a license or certification may be required to operate certain types of machinery for completing inventory tasks (e.g., operating a forklift in a warehouse inventory location). In another example, a certification may be required to handle controlled substances (e.g., pharmaceuticals, explosives, insecticides). In some examples, task performer attribute data includes specific task performer abilities and operational efficiencies. For example, an ability or inability to lift weights over 10 kilograms, or a weight rating on equipment may be stored in the task performer attributes 210.

Other examples of data used to train a machine learning model are those associated with tasks and/or inventory items ("products") (operation 212). Examples of these data include: storage conditions required for particular types of products (e.g., environmental requirements such as temperature/humidity, physical requirements such as shelf size/weight limit); product configuration (e.g., container size, units per container, container weight); tools or equipment used for location transportation of product to an inventory location (e.g., refrigerated container, insulated container, motorized dolly); and the like.

In some examples, some tasks may be required to be performed in a particular sequence. These requirements may be stored in task sequence data (operation 214). For example, based on limitations on the load bearing ability of some products, a freight dolly may be loaded with certain products on a bottom and other products stacked on top. This stacking/loading aspect may be used to train a machine learning model to consider an order of unloading of products when establishing a route and/or sequence in which inventory tasks are to be completed. That is, the system may be trained to avoid unloading an entire freight dolly to stock a product on a bottom of the dolly in a first inventory task, but rather schedule this task later in a route so that the freight dolly is nearly already unloaded.

In other examples, task sequence data may reflect an urgency or priority of some tasks. For example, some inventory tasks are labeled as urgent because of a location in which they are used (e.g., in a surgical theater). In other examples, some inventory tasks are labeled as urgent because of the conditions needed to maintain product stability (e.g., storage temperature). In still other examples, some inventory tasks are labeled as urgent based on a level of remaining inventory compared to a consumption rate of the product. These factors may be identified or otherwise reflected in the task sequence data (operation 214).

These data may be used to train the machine learning model so that, once trained, the machine learning model may be applied to a target set of inventory tasks (operation 216).

Returning to FIG. 2A, the system may receive a target set of tasks to be completed by a task performer over a period of time (e.g., a shift or a portion of a shift) (operation 218). In some examples, the target set of tasks is equivalently referred to as "target data." Regardless of the nomenclature used, the system receives the target set of tasks in preparation for analyzing the target set of tasks and generating a route for performing the target set of tasks according to a trained machine learning model.

The system may optionally identify one or more attributes associated with target tasks that may affect a route and/or sequence in which the tasks of the target set are performed (operation 220). In some embodiments, the attributes associated with target tasks may include any one or more of those described above in the context of training the machine learning model (e.g., in the context of operation 202).

More specifically, FIG. 2A illustrates example attributes for convenience of explanation. Example attributes include an urgency of one or more tasks of the target of tasks (operation 228). An urgency or priority may indicate a time before which a task must be completed, may simply be specified as a label indicating a priority level (e.g., high priority, normal priority, low priority), or may indicate a sensitivity of a task. Example sensitivities include environmental conditions that must be maintained and the potential for spoilage or loss if those conditions are exceeded.

Another example attribute that may be associated with one or more tasks of the target set of tasks are locations of tasks relative to one another and/or relative to inventory locations (operation 232). The system may reference inventory site location data (e.g., in a facility floorplan) in coordination with task locations associated with the target set of tasks. This analysis may enable the system to identify a preliminary route (e.g., a shortest distance to perform tasks of the target set) that may then be revised based on other attributes and/or operations of the trained machine learning model.

Another example attribute that may be associated with one or more tasks of the target set of tasks are traffic delays associated with inventory locations and/or on routes to the inventory locations (operation 236). For example, congestion associated with certain routes (e.g., surrounding a nurse's station, at large intersections during a shift change) may be identified in the context of the set of target tasks via the operation 236.

Similarly, equipment needed to complete inventory tasks may be identified when analyzing target task attributes as can availability of the needed equipment (operation 240). In this way, the system may include constraints associated with required equipment availability in its scheduling and/or routing of tasks. For example, target tasks may be arranged in a sequence and along a timeline so that equipment needed to complete inventory tasks is available when the task is to be performed. Example equipment includes ladders, mobile refrigerators/freezers, forklifts, hand trucks, freight dollies, and the like.

The system may also identify a time of day at which tasks are to be completed (operation 242). This timing may also be another factor that, based on the analysis of the trained machine learning model, may affect a route and/or sequence of tasks. A time of day may be associated with other factors identified in other attributes, such as shift changes, traffic delays, and the like. But time of day may have other effects that are not specifically attributable to another cause.

The system may identify attributes associated with task performers and/or products in the target set of tasks (operation 244). Because the training data may also include these attributes, the trained machine learning system may execute a comparison between training data and target data or otherwise use the trained model to identify correlations between training data and target data that facilitate analysis of a route and/or sequence in which target tasks are to be completed.

Figure 2B:
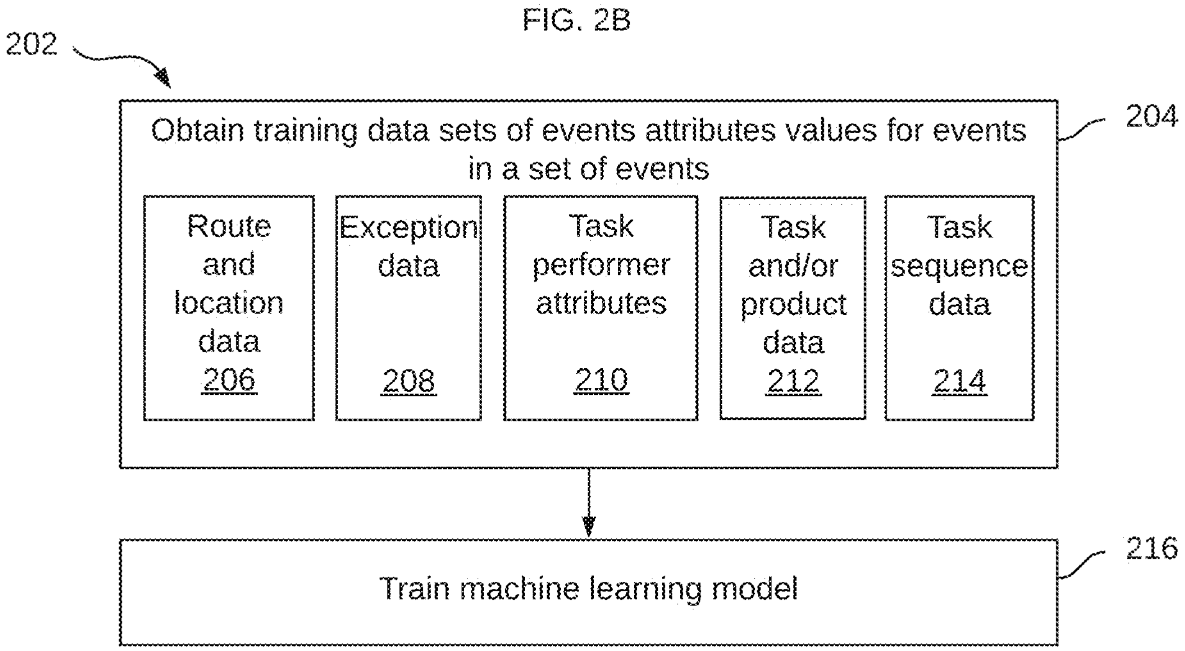
FIG. 2B schematically illustrates a technique for training a machine learning model to optimize a route for completing a set of tasks in accordance with one or more embodiments.

Analogous to the description in FIG. 2B, the system may identify route and/or location closures that may affect a route and/or sequence of target tasks (operation 246). Examples may include a temporary and/or scheduled closure of an inventory location (e.g., during use of a surgical theater) and/or a temporary and/or scheduled closure of a portion of a route that would otherwise be available for use.

The system may analyze any one or more of these attributes of tasks of a target set of tasks in preparation of generating a route and/or sequence for performing the target set of tasks (operation 248). As described above, the route and/or sequence may be generated by a trained machine learning model employed by the system. The trained machine learning model may use its analysis of the training data to analyze competing factors and influences in the target data to generate the route for completing target tasks and/or a sequence in which target tasks are to be completed.

Upon generating a route according to the operation 248, the system may transmit the generated route to a task performer. In some examples, the route is transmitted to a wireless device (e.g., client 102A) used by a human task performer. In other examples, the route is transmitted to a wireless device that may follow the generated route and/or perform task, such as an autonomous device or robot.

In some examples, the system may receive an additional target task after a route has been generated for a predecessor set of target tasks (operation 252). For example, a supply administrator may provide one or more additional tasks to perform. These one or more additional tasks may be added to the target set of tasks via a client (e.g., client 102B).

Upon receiving this additional target task, the system may determine whether add the additional target task to the set of target tasks (operation 256). In some examples, the system may determine whether or not to add the additional target task to a set of target tasks already underway based on the any number of factors. These factors may include an urgency of the new task, an amount of delay added to an already generated route for the predecessor set of target tasks or a distance of deviation from the already generated route needed to perform the additional task. The system may use any of the other factors described above (e.g., availability of equipment, inventory location closures, task performer certifications, product requirements) to determine whether to add the additional task to a route for the predecessor set of tasks.

If the new task is added to the route, the system may return to the operation 220 and re-analyze the target set of tasks that now includes the added task. The system may omit any tasks of the predecessor target set of tasks that have been completed and include in its analysis only those target tasks yet to be completed in the set.

If the additional task is not added, or alternatively, if no additional task is received, the system may monitor performance of the task performer regarding the performance of the assigned tasks (operation 260). Based on performance data, the system may update a training corpus. Examples of performance data include task performer efficiency (tasks completed per unit time), routes actually taken compared to the generated route, speed, and the like.

In one example, performance data associated with each task may be recorded by a mobile computing device used by (or integrated with) a task performer. For example, actual task completion times, delays, deviations from routes or scheduled task sequences may collected (e.g., via transmission from a mobile computing device that uses GPS or beaconing technology to track location versus time). This information may be provided to the machine learning model as additional observations for the training corpus and used to improve the analysis of the machine learning model.

4. Generating a Set of Routes for a Corresponding Group of Task Performers Based on Variable Task Locations The possible inefficiencies described above in Section 3 are magnified and further complicated for situations in which multiple people or devices (e.g., robots) perform inventory management tasks. The delays, inefficiencies, and risks to products or processes from a poorly chosen route between tasks (involving a longer distance or a delayed travel time) for a single task performer are all magnified when multiple inefficient routes are chosen for multiple task performers. Similarly, an sequence of tasks that is inefficient or prone to delay for a single inventory task performer is even more problematic when multiple task performers are instructed to execute corresponding poorly chosen task sequences.

More generally, when problematic task routes are replicated across multiple people, multiple devices, and/or multiple shifts, the cost to an operation can be significant. These costs may be embodied as added labor costs/lower task performer efficiencies, inventory item loss (e.g., from being misplaced) or spoilage, and the like. These challenges are compounded by the unpredictability of some inventory management tasks that may vary from day to day and/or from shift to shift.

Figure 3:
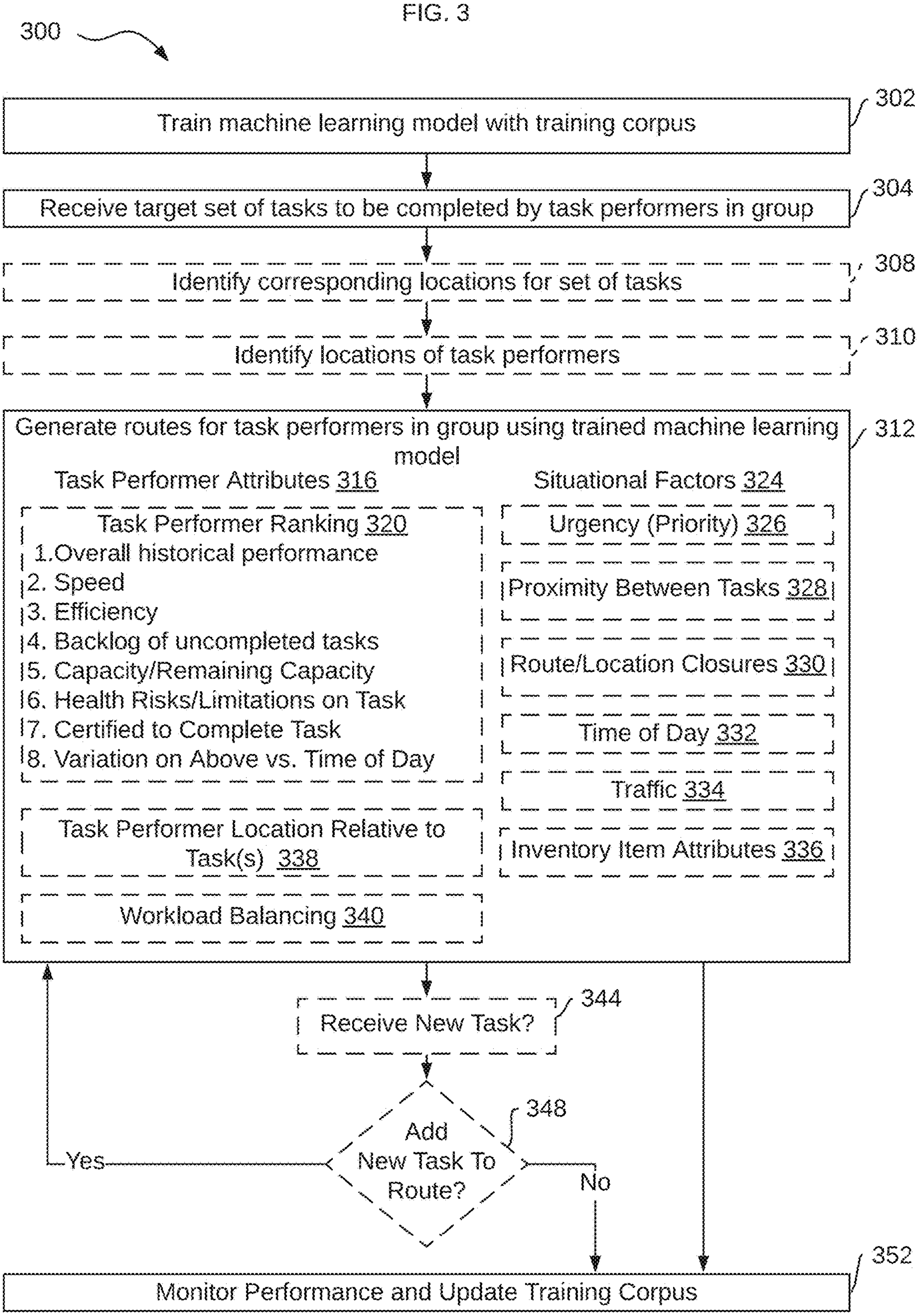
FIG. 3 illustrates an example method for optimizing routes for completing a set of tasks by a group of task performers, in accordance with some embodiments.

FIG. 3 illustrates example operations, collectively referred to as a method 300, that extends the machine learning techniques described above to generating a plurality of routes for individual task performers in a group of task performers in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

The method 300 may begin similarly to the method 200 by training a machine learning model with a training corpus (operation 302). The training may include inventory data, situational factor patterns (e.g., shift changes, facility maps, traffic patterns), and task performer data (e.g., efficiency, task completion times, specialized task certifications, speed). Any of the techniques for training a machine learning model described above in the context of FIGS. 1, 2A, and 2B may be extended to the method 300. That is, the training data may include sets that are labeled or indicated for both on an individual task performer basis as well as for groups of task performers. In this way, the machine learning model may be trained to recognize effects and/or factors that come from the cooperative work of a group of task performers and apply the training to a target set of tasks to be performed by a (same or different) group of task performers.

The system may receive a set of tasks, analogous to the operation 218 with the exception that the system understands the received set of tasks are to be completed by a group of task performers rather than an individual task performer (operation 304).

In some embodiments, the system identifies locations corresponding to the inventory tasks in the target set of inventory tasks (operation 308). In some examples, the system may identify these locations by accessing inventory databases in communication with the system. The system may check inventory levels for inventory items having a same identifier (e.g., part number, SKU) as those associated with the target set of tasks. The system may optionally identify inventory locations at which inventory levels for inventory items are low. These locations may then be used in cooperation with floor plan data, and any of the other attributes/characteristics to generate routes for task performers.

Alternatively, in some embodiments of the method 300, the received target set of tasks may optionally include an identification of the locations at which the tasks are to be performed (operation 308). For example, the received target set of tasks may include data specific to the performing the task (e.g., an inventory item identifier and task description, such as "restock item ABC") as well as a location at which the inventory task is to be performed (e.g., "restock item ABC at location 123"). When present, this optional data may improve the operational efficiency of the machine learning model because the model need not identify the inventory task locations by other means, such as those described above.

The system may optionally identify locations of task performers (operation 310). In some examples, the locations of task performers may be identified by accessing geolocation systems on client devices associated with the task performers. This feature may improve efficiency of the system overall by generating individual routes for task performers based on corresponding current locations. This feature may be particularly useful when receiving an additional task that is added to the target set of tasks when performance of the target set of tasks is already underway. In this way, a location of the new task and a current location of task performers may be compared so that the newly added task may be performed by a geographically proximate task performer.

The trained machine learning model may then generate routes for individual task performers that, collectively, perform the tasks of the target set of tasks (operation 312). The routes may be based on an expanded set of attributes that incorporates differences between task performers. These attributes are illustrated in FIG. 3 under the heading "task performer attributes 316." Furthermore, the routes may also be based on situational factors that are associated with the target tasks and inventory items themselves. These are illustrated in FIG. 3 under the heading "situational factors 324." Once analyzed, the system may assign tasks to task performers within the group of task performers based on one or more factors (operation 312).

Turning first to the task performer attributes 316, various attributes that are specific to each of the task performers may be summarized in term of a task performer ranking 320. Task performer attributes are described above. Ranking the task performers (e.g., using unique task performer identifiers) enables the system to distribute tasks to performers within the group to optimize task completion efficiency (or speed) across the group of task performers.

Attributes that may be used to rank task performers include a historical performance ranking, such as an average performance ranking over a period of time (e.g., weeks, months). The system may also include attributes that measure task performer productivity, such as a historical speed (e.g., average distance traveled/unit time), a task completion efficiency (e.g., tasks/unit time), and the like. In addition to historical factors, the task performer ranking 320 may also include current measurements of a capacity of a task performer to perform tasks. For example, a ranking may include an indication of whether a task performer currently has a backlog of uncompleted tasks and/or a number of tasks that are in a backlog. Additionally, the ranking may include a measurement of task performer capacity and/or remaining capacity. Examples of these include, but are not limited to, a number/remaining number of tasks/unit time, a number of tasks/shift, a remaining shift time, remaining power level (e.g., for a battery powered robotic task performer), and the like.

In still other examples, the ranking 320 may include attributes that reflect capabilities (rather than capacity, like the preceding attributes) of task performers to complete tasks. Capability-related task performer attributes include health risks or other physical or operational limitations that may reduce or limit the capability of the task performer to complete some types of tasks.

Another example of a capability related attribute is whether task performers have certifications or training required to perform a task. For example, a human task performer in a warehouse may have a high overall performance rating, speed, and efficiency, but also have a limited range of movement in a joint that limits the ability to reach high shelves or carry heavy loads. This health risk factor would decrease a ranking associated with this human task performer involving tasks that involve the limited range of motion (e.g., lifting inventory items to a shelf over a threshold height).

In another example, a human task performer may have moderate values of speed and efficiency that are reflected in a modest ranking (e.g., in the middle 20% of rankings). However, this task performer may be one of a very few task performers in a group having a certification authorizing work on a particular task (e.g., electrician license, enclosed work area training). This certification may increase a ranking of the human task performer performing electrical work in an underground utility room (or alternatively reduce a ranking of task performers lacking these certifications). Some of these factors can be used to distribute tasks across a group of task performers to optimize efficiency, reduce risks of error or injury, comply with policies and/or regulations, and the like.

Any of the preceding attributes may include a corresponding variation over one or more time scales. For example, attributes may be scaled according to patterns of attribute values exhibited over a historical course of a year, month, a day, a shift, or the like. In one illustration, human task performers may be less efficient at a beginning of a shift, an end of a shift, or both. The system may recognize this pattern and apply a temporary scaling factor during these times to decrease attribute values associated with an average efficiency and/or apply a temporary scaling factor that increases attribute values associated with the average efficiency between these beginning and ending times. In another example, the system may apply a similar scaling factor that decreases efficiency of a robotic task performer as its battery capacity decreases (or alternatively, after a certain distance traveled and/or number of tasks completed after a charging cycle).

If not already analyzed in the operations 308 and/or 310, the system may optionally identify task performer locations relative to locations at which tasks are to be performed (operation 338). When employed, the system may use this attribute to identify a starting position for one or more routes for corresponding task performers that is based on a location of the one or more task performers. This is in contrast to some embodiments in which the system identifies route starting positions based on locations at which the inventory tasks are to be performed themselves. This distinction may be particularly relevant when adding new tasks to a set of tasks that is already being performed because a newly added task may be assigned to a task performer proximate to the newly added task. Using a current task performer location to generate a route may improve overall task performer group efficiency by minimizing added travel distance.

In some embodiments, workload balancing across the group of task performers may be included in the route generation process (operation 340). This attribute applies a preference for assigning tasks uniformly to task performers, assigning more tasks to more efficient workers, and other similar variations in workload distribution.

The system may also optionally incorporate other factors into its analysis for generating routes for task performers in a group (operation 312). Example additional factors are illustrated in FIG. 3 under the heading "situational factors 324." Some of these situational factors 324 have been described above in the context of FIG. 2. For example, these include task urgency/priority (operation 326), proximity between tasks if not already identified during the operation 308 (operation 328), route and/or location closures (operation 330), a time of day (operation 332), indications of traffic density and traffic patterns (instantaneously and/or as a function of time) (operation 334), or/or attributes associated with inventory items themselves (operation 336).

Depending on the situation, the system may apply other factors and/or attributes to the generation of routes and the distribution of tasks between task performers. For example, in a situation in which tasks are to be completed in a setting exposed to exterior weather conditions (e.g., a farm operation, exterior inventory location, cargo port or shipyard), weather data may be incorporated into the analysis. This may be further combined with other situational factors and analyzed using the machine learning model. For example, certain routes may flood during rain, which could decrease the transit rate through the route and/or cause a route/location closure (which effects operation 330). Over a large enough area (e.g., an orchard or farm that is many square miles), weather conditions may vary across the area leading to prioritization of some tasks over others. For example, weather data may be used to prioritize food harvesting in a portion of a farm not experiencing rain in preference to an area that is receiving rain. In another example, weather data may be used to prioritize food harvesting in a portion of a farm receiving hail so as to minimize damage to the crop.

Event data may also be incorporated into the analysis, such as public road closures (e.g., due to scheduled events such as holidays, parades), traffic data on public roads (e.g., from congestions, breakdowns). Weather, public road traffic, and event data may be received via a third party information source.

Once the trained machine learning model analyzes these attributes associated with target tasks and task performers, the system may generate the routes for one or more of the task performers of the group of task performers and transmit the task routes (operation 312).

In one example, the system may receive one or more new tasks after the initial analysis and assignment of tasks and routes (operation 344). In some examples, the system may optionally receive a new task during performance of the previously generated routes (operation 344).

The system may optionally analyze the new task to determine whether it may be added to an existing route or determine, upon receipt, to not add the new task to an existing route (operation 348). If the new task is not added to an existing route, then the method continues to monitor the performance of the tasks as described below in the context of operation 352. If a new task is added to an existing route, the route and its associated tasks are re-analyzed with the newly included task. The previously generated routes associated with predecessor tasks may be re-analyzed and regenerating to include the newly added task according to the criteria described above in the context of operation 312.

However, in some cases, the results of the operation 312 may determine that the addition of the new task to an existing route is too time consuming, inefficient, or resource intensive to complete during execution of the predecessor routes (operation 348). That is, the delays to other tasks on the list are too significant, the route lengths are extended by too much, and/or the addition of the new task causes a route to pass through a traffic congested or otherwise physically restricted area. In other cases, the operation 312 is not performed and the new task is simply not added to a predecessor route.

Regardless of whether a new task is added to a predecessor route or not added, the system may monitor performance of the one or more routes (operation 352). Data transmitted by one or more of the task performers (or a mobile computing device used by the task performer(s)) regarding task completion times, transit times between task locations, actual routes taken and/or deviations in routes, transit delays, and other data related to the previously described factors may be transmitted to the machine learning model and used to update the training corpus (operation 352).

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4:
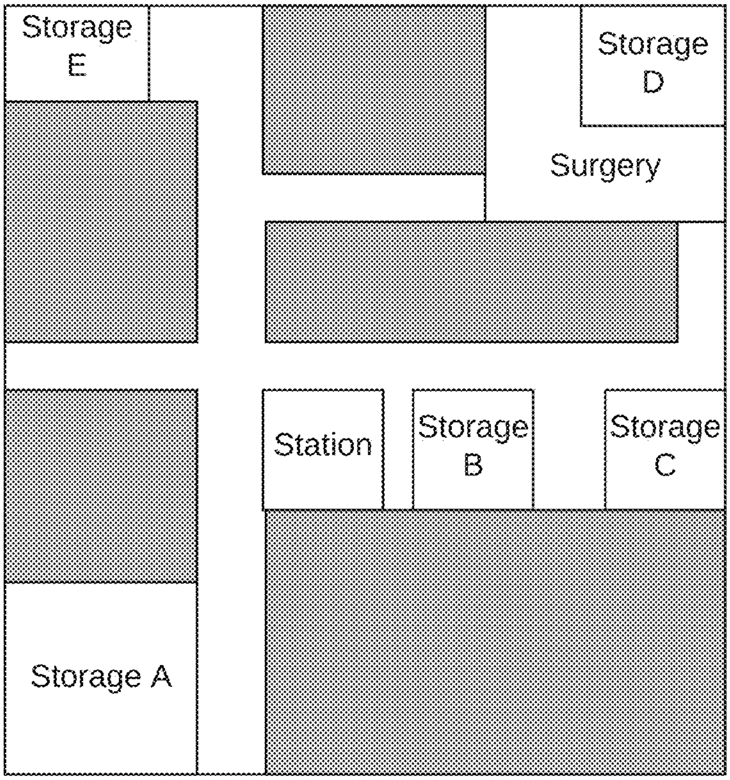
FIG. 4 is a schematic layout of a single floor in a hospital illustrating various locations of inventory locations, in accordance with some embodiments.

FIG. 4 presents a schematic illustration a specific example application of some embodiments of the techniques described above. In the example shown, a plan view schematic of a floor of a hospital 400 includes storage locations A, B, C, D, E, a surgical theater ("surgery") and a care coordination station ("station"). In one example, a task performer may be assigned tasks that require checking inventory levels of products stored in Storage A and Storage C, resupplying a first product in Storage B (within the surgical theater), resupplying a second product in Storage D, and checking for recalled products in Storage E.

Absent application of the machine learning techniques herein, a task performer would have the discretion to determine a route to and/or an order in which these tasks were performed. The route selected may vary greatly on the preferences of a particular task performer. For example, in one example, a task performer may wish to minimize the distance traveled by completing tasks starting at Storage A and proceeding to Storage B, C, D, and E in that order.

However, trained machine learning systems of the present disclosure may perform a more precise analysis that takes into account multiple attributes that may alter the route taken to perform the various tasks, a starting location and/or task, and/or the order in which the tasks are performed. For example, foot traffic delays around the Station during shift changes may inhibit and/or slow access to Storage B and C. Use of the Surgery at certain times may prevent access to Storage D, while at the same time the importance of replenishing Storage D may be extremely high. Using the techniques described above, these attributes may be incorporated into a route generated by the system.

In some examples, using the techniques described above, a route may be generated by the system by minimizing a total distance to be traversed by the task performer in the completion of the tasks in the set. Returning to FIG. 4 to illustrate this point, a primary route starting at Storage A and involving tasks at each of Storage A, B, C, D and E may involve completing the task at Storage A first, then proceeding in a straight line to Storage E, then proceeding to D, followed by C and B.

Returning again to the illustration of FIG. 1, Storage D may have occasionally restricted access due to procedures performed in the surgery. At the same time, restocking Storage D may be urgent given that the supplies in Storage D may be used during surgeries. The machine learning model may use both the urgency and the surgery schedule to identify an appropriate opportunity to schedule inventory tasks associated with Storage D. Similarly, Storage B and Storage C are near the Station, which may have traffic congestion during shift changes (when the number of people in the area effectively doubles and the traffic through the adjacent hallways increases even more). For this reason, tasks associated with Storage B and Storage C may be scheduled to avoid shift change times.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
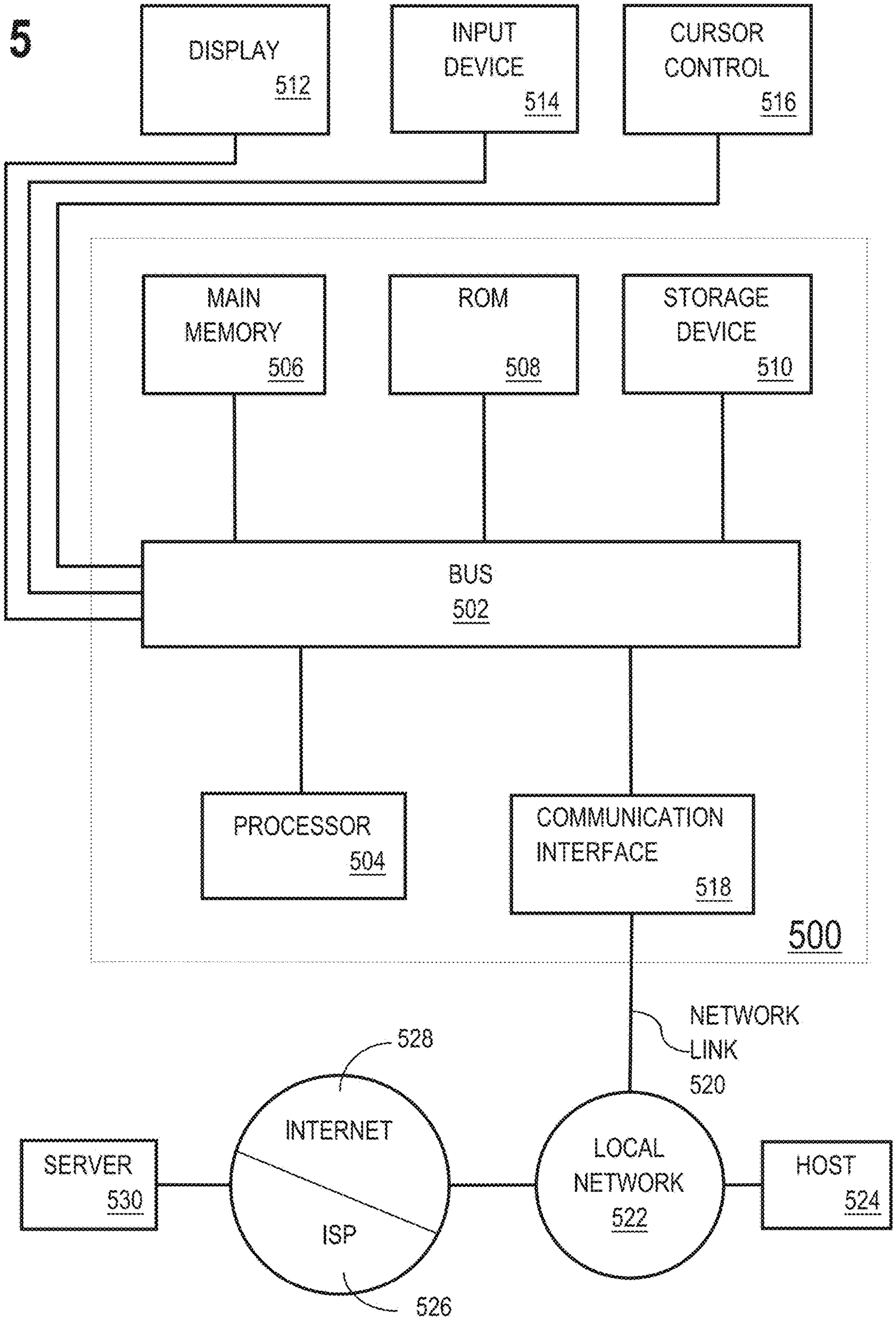
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:

training a machine learning (ML) model to select routes for robots to perform target sets of tasks, at least by:

obtaining training data sets, each training data set comprising:

a set of characteristics of a set of previous tasks performed by one or more task performers, the set of characteristics comprising one or more of:

a location associated with a particular previous task of the set of previous tasks;

a time duration for performing the particular previous task;

a time at which the particular previous task was performed;

a route taken to perform the particular previous task;

a sequence in which tasks of the set of previous tasks were performed;

an attribute of a task performer that performed the particular previous task;

wherein the attribute of the task performer that performed the particular previous task comprises a maintenance schedule of one or more robots that performed the particular previous task;

training the ML model based on the training data sets;

receiving a first target set of tasks to be performed, wherein the first target set of tasks comprises respective locations of the first target set of tasks;

receiving one or more task performer attributes comprising respective locations of a plurality of robots, wherein the one or more task performer attributes further comprises a remaining power level of one or more robots in the plurality of robots;

applying the trained ML model to the first target set of tasks and the one or more task performer attributes to generate a plurality of ML-generated routes for the plurality of robots to collectively perform the first target set of tasks, based at least in part on respective proximities of the plurality of robots to respective tasks in the first target set of tasks;

controlling the plurality of robots at least by:

transmitting, to a first robot in the plurality of robots, instructions to perform a first target task in the first target set of tasks using a first ML-generated route in the plurality of ML-generated routes;

transmitting, to a second robot in the plurality of robots, instructions to perform a second target task in the first target set of tasks using a second ML-generated route in the plurality of ML-generated routes;

after transmitting the instructions to the first robot and the second robot, receiving an additional target task;

determining that the first robot is more geographically proximate than the second robot to a location of the additional target task;

modifying the first ML-generated route so that the first ML-generated route comprises the additional target task;

controlling the first robot at least by transmitting, to the first robot, instructions to perform the first target task and the additional target task using the first ML-generated route;

receiving, from the first robot, task performance data that describes performance of the first robot while performing tasks using the first ML-generated route;

retraining the ML model based at least in part on the task performance data received from the first robot.

2. The one or more non-transitory computer-readable media of claim 1, wherein training the ML model comprises determining that none of the set of previous tasks included a route through a particular location at a particular time of day, and wherein the first ML-generated route selected by the ML model for performing the first target task avoids the particular location at the particular time of day.

3. The one or more non-transitory computer-readable media of claim 1, wherein:

training the ML model comprises determining that the particular previous task of the set of previous tasks was performed first in the sequence in which the set of previous tasks were performed;

training the ML model further comprises assigning a high priority to completing the particular previous task; and wherein the high priority is assigned to a task in the first target set of tasks similar to the particular previous task of the set of previous tasks.

4. The one or more non-transitory computer-readable media of claim 3, the operations further comprising:

inferring a set of priorities for the first target set of tasks based on the sequence in which the tasks of the set of previous tasks were performed, each priority of the set of priorities corresponding to a task in the first target set of tasks.

5. The one or more non-transitory computer-readable media of claim 1, wherein modifying the first ML-generated route comprises generating a revised sequence of target tasks that include the additional target task.

6. The one or more non-transitory computer-readable media of claim 1, wherein modifying the first ML-generated route comprises generating a revised sequence of target tasks that excludes completed target tasks of the first target set of tasks.

7. The one or more non-transitory computer-readable media of claim 1, wherein modifying the first ML-generated route comprises identifying one or both of:

one or more target tasks of the first target set of tasks to be delayed in response to including the additional target task; or one or more target tasks of the first target set of tasks that is required to be completed according to the first ML-generated route, despite including the additional target task.

8. The one or more non-transitory computer-readable media of claim 1, the operations further comprising:

analyzing the additional target task to determine if the additional target task can be added to an existing ML-generated route in the plurality of ML-generated routes.

9. The one or more non-transitory computer-readable media of claim 1, wherein the one or more task performer attributes further comprises a number of tasks already performed by the first robot.

10. The one or more non-transitory computer-readable media of claim 1, wherein the one or more task performer attributes further comprises a distance already traveled by the first robot.

11. A method comprising:

training a machine learning (ML) model to select routes for robots to perform target sets of tasks, at least by:

obtaining training data sets, each training data set comprising:

a set of characteristics of a set of previous tasks performed by one or more task performers, the set of characteristics comprising one or more of:

a location associated with a particular previous task of the set of previous tasks;

a time duration for performing the particular previous task;

a time at which the particular previous task was performed;

a route taken to perform the particular previous task;

a sequence in which tasks of the set of previous tasks were performed;

an attribute of a task performer that performed the particular previous task;

wherein the attribute of the task performer that performed the particular previous task comprises a maintenance schedule of one or more robots that performed the particular previous task;

training the ML model based on the training data sets;

receiving a first target set of tasks to be performed, wherein the first target set of tasks comprises respective locations of the first target set of tasks;

receiving one or more task performer attributes comprising respective locations of a plurality of robots, wherein the one or more task performer attributes further comprises a remaining power level of one or more robots in the plurality of robots;

applying the trained ML model to the first target set of tasks and the one or more task performer attributes to generate a plurality of ML-generated routes for the plurality of robots to collectively perform the first target set of tasks, based at least in part on respective proximities of the plurality of robots to respective tasks in the first target set of tasks;

controlling the plurality of robots at least by:

transmitting, to a first robot in the plurality of robots, instructions to perform a first target task in the first target set of tasks using a first ML-generated route in the plurality of ML-generated routes;

transmitting, to a second robot in the plurality of robots, instructions to perform a second target task in the first target set of tasks using a second ML-generated route in the plurality of ML-generated routes;

after transmitting the instructions to the first robot and the second robot, receiving an additional target task;

determining that the first robot is more geographically proximate than the second robot to a location of the additional target task;

modifying the first ML-generated route so that the first ML-generated route comprises the additional target task;

controlling the first robot at least by transmitting, to the first robot, instructions to perform the first target task and the additional target task using the first ML-generated route;

receiving, from the first robot, task performance data that describes performance of the first robot while performing tasks using the first ML-generated route;

retraining the ML model based at least in part on the task performance data received from the first robot;

wherein the method is performed by at least one device including a hardware processor.

12. The method of claim 11, wherein training the ML model comprises determining that none of the set of previous tasks included a route through a particular location at a particular time of day, and wherein the first ML-generated route selected by the ML model for performing the first target task avoids the particular location at the particular time of day.

13. The method of claim 11, wherein:

training the ML model comprises determining that the particular previous task of the set of previous tasks was performed first in the sequence in which the set of previous tasks were performed;

training the ML model further comprises assigning a high priority to completing the particular previous task; and wherein the high priority is assigned to a task in the first target set of tasks similar to the particular previous task of the set of previous tasks.

14. The method of claim 13, further comprising inferring a set of priorities for the first target set of tasks based on the sequence in which the tasks of the set of previous tasks were performed, each priority of the set of priorities corresponding to a task in the first target set of tasks.

15. The method of claim 11, wherein modifying the first ML-generated route comprises generating a revised sequence of target tasks that include the additional target task.

16. The method of claim 11, wherein modifying the first ML-generated route comprises generating a revised sequence of target tasks that excludes completed target tasks of the first target set of tasks.

17. The method of claim 11, wherein modifying the first ML-generated route comprises identifying one or both of:

one or more target tasks of the first target set of tasks to be delayed in response to including the additional target task; or one or more target tasks of the first target set of tasks that is required to be completed according to the first ML-generated route, despite including the additional target task.

18. The method of claim 11, further comprising:

analyzing the additional target task to determine if the additional target task can be added to an existing ML-generated route in the plurality of ML-generated routes.

* * * * *